United States Patent
Suzuki et al.

(10) Patent No.: US 7,424,394 B2
(45) Date of Patent: Sep. 9, 2008

(54) UTILITY DIAGNOSING EQUIPMENT, OPERATIONAL PROGRAM THEREFOR, AND UTILITY DIAGNOSING METHOD

(75) Inventors: Hideaki Suzuki, Hitachi (JP); Masahiko Saito, Moriguchi (JP); Toshimi Yokota, Hitachiota (JP); Tomotsune Taira, Shizuoka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/211,434

(22) Filed: Aug. 26, 2005

(65) Prior Publication Data

US 2006/0136175 A1 Jun. 22, 2006

(30) Foreign Application Priority Data

Aug. 27, 2004 (JP) ............................. 2004-248585

(51) Int. Cl.
*G06F 15/00* (2006.01)
(52) U.S. Cl. ...................................... 702/182; 702/183
(58) Field of Classification Search ................ 702/182, 702/183
See application file for complete search history.

(56) References Cited

U.S. PATENT DOCUMENTS

| | | | | |
|---|---|---|---|---|
| 5,481,481 | A * | 1/1996 | Frey et al. ..................... 702/82 |
| 5,566,092 | A * | 10/1996 | Wang et al. ................... 702/185 |
| 5,602,761 | A * | 2/1997 | Spoerre et al. ............... 702/179 |
| 6,862,540 | B1 * | 3/2005 | Welch et al. .................... 702/44 |
| 6,930,597 | B2 * | 8/2005 | Tecchiolli et al. ............ 340/517 |

FOREIGN PATENT DOCUMENTS

| | | |
|---|---|---|
| JP | 3119046 | 10/2000 |
| JP | 2002-123881 | 4/2002 |
| JP | 2002-279091 | 9/2002 |
| JP | 2003-22332 | 1/2003 |
| JP | 2003-150732 | 5/2003 |

* cited by examiner

*Primary Examiner*—John E Barlow, Jr.
*Assistant Examiner*—Douglas N Washburn
(74) *Attorney, Agent, or Firm*—Antonelli, Terry, Stout & Kraus, LLP.

(57) ABSTRACT

A utility diagnosing equipment can recognize an abnormality or a normality in a plurality of utilities of an identical type, which would not be recognized when an absolute threshold is set. The equipment accepts state values from the plurality of utilities, sets an average value of the state values of each utility to a proxy value, finds a relative value between the state value of each utility and the proxy value thereof, and displays the relative value for each utility. The relative values of the utilities exceeding a predetermined threshold is highlighted.

14 Claims, 17 Drawing Sheets

STATE COMPARISON DISPLAY MODE

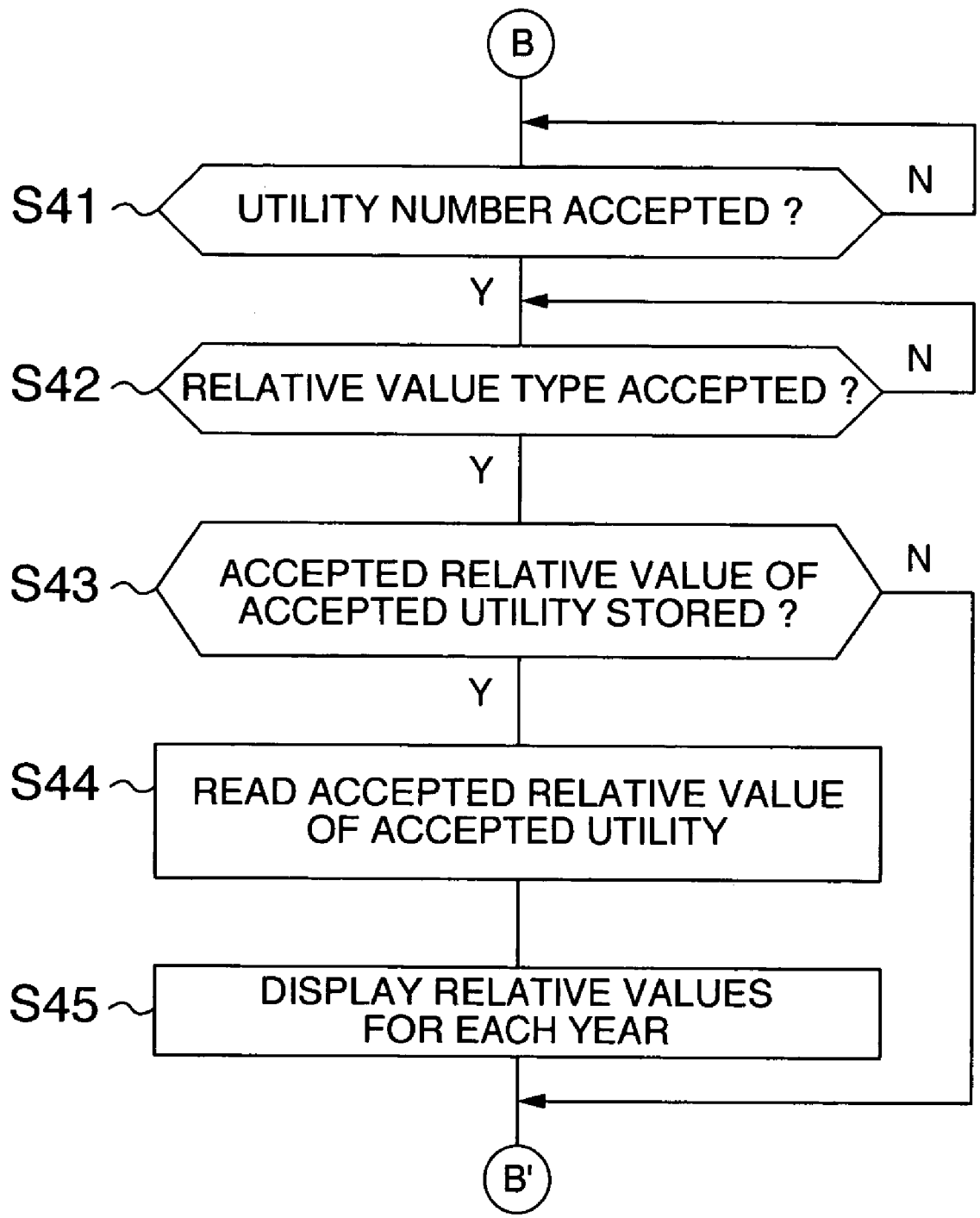

UTILITY DIAGNOSING EQUIPMENT, OPERATIONAL PROGRAM THEREFOR, AND UTILITY DIAGNOSING METHOD

BACKGROUND OF THE INVENTION

The present invention relates to utility diagnosing equipment for diagnosing a plurality of utilities of an identical type on the basis of state values from the plurality of utilities, and also relates to an operational program for the equipment and a utility diagnosing method.

A utility such as an air conditioner is used, in many cases, together with a controller for controlling the utility. The controller has both a function of transmitting user's control instruction to the utility and a function of monitoring the state of the utility. Thus, when an abnormality takes place in the utility, the controller informs the user of the abnormality.

As disclosed in JP-B-3119046 in these years, there is proposed a method for increasing a maintenance efficiency by monitoring such a utility as mentioned above from a remote place using a typical network technique. In this method, a controller monitors the state value of the installed utility. And when the state value exceeds a preset threshold, the controller transmits a signal indicative of a sign of abnormality via a network to a host side, and thus the host side recognizes the abnormality of the utility.

In the prior art, however, as a threshold for the state value of the utility, an absolute threshold is set, not paying any consideration to an environmental change, a change with time, etc. in the utility. For this reason, the prior art has problems that the controller, in some cases, cannot recognize an abnormality in the utility even when the abnormality is true, or conversely can sometimes recognize a normality to the utility as an abnormality even when the normality is true. More specifically, when an absolute threshold is set for the operating temperature of the utility for example, the utility installed in a cold district cannot recognize an abnormally-high operating temperature for the utility as an abnormality. Meanwhile, the utility installed in a tropical district cannot recognize an abnormally-low operating temperature for the utility as an abnormality. When the utility is deteriorated with time, the deteriorated utility cannot recognize as an abnormality a state value abnormal to the deteriorated utility.

SUMMARY OF THE INVENTION

In view of the above problems in the prior art, it is therefore an object of the present invention to provide utility diagnosing equipment which can recognize an abnormality or a normality in a utility that would not be able to be correctly recognized as so when an absolute threshold is set for the utility.

In accordance with an aspect of the present invention, the above object is attained by providing utility diagnosing equipment for diagnosing a plurality of utilities of an identical type on the basis of state values from the utilities, comprising:

a state value accepting unit for accepting the state values from the plurality of utilities;

a proxy value calculating unit for taking statistics of the state values from the respective utilities to calculate a proxy value representative of states of each utility;

a relative value calculating unit for finding a relative value for each utility between the state value of each utility and the proxy value; and an output unit for outputting the relative value for each utility and/or utility identification information about the utility when the relative value exceeds a predetermined range.

In accordance with another aspect of the present invention, the above object is attained by providing a utility diagnosing program for diagnosing a plurality of utilities of an identical type on the basis of state values from the utilities, comprising:

a state value accepting step of accepting the state values from the plurality of utilities;

a proxy value calculating step of taking statistics of the state values from the plurality of utilities to calculate a proxy value representative of the states of each utility;

a relative value calculating step of finding a relative value between the state value of each utility and the proxy value for each utility; and an output step of outputting the relative value for each utility and/or utility identification information about the utility when the relative value exceeds a predetermined range.

The utility diagnosing program causes a processor to execute:

a state value memory step of storing a time-series state value for each utility accepted in the state value accepting step; and a completing step of completing a missing state value in the time-series state values of the utilities stored in the state value memory step.

In the proxy value calculating step, a completed proxy value at each time is calculated as the proxy value with use of the state value of the utilities at the time completed in the completing step.

In the output step, a relative value between the state value of each utility at each time completed in the completing step and the completed proxy value of each time, and/or utility identification information about the utility when the relative value exceeds a predetermined range is output.

In this case, in the completing step, a moving average of the state values of the utilities at the respective times may be found as a moving average width of a predetermined time width to complete the missing state value. In the proxy value calculating step, an average value of the state values of the utilities at the respective times completed in the completing step may be used as the completed proxy value at each time.

The utility diagnosing program causes a processor to execute:

an allowable range accepting step of accepting the predetermined range for the relative value; and an abnormality decision step of deciding whether or not the relative value of each utility at each time is in the predetermined range accepted in the allowable accepting step.

In the output step, when it is decided in the abnormality decision step that there is a relative value not in the predetermined range among the relative values of the utilities at the respective times, the relative value is highlighted.

In accordance with a further aspect of the present invention, the above object is attained by providing a utility diagnosing method for diagnosing a plurality of utilities of an identical type on the basis of state values from the plurality of utilities, comprising:

a state value accepting step of accepting the state values from the plurality of utilities;

a proxy value calculating step of taking statistics of the state values from the plurality of utilities to calculate a proxy value representative of the states of each utility;

a relative value calculating step of a relative value between the state value of each utility and the proxy value; and an output step of outputting the relative value for each utility and/or utility identification information on the utility when the relative value exceeds a predetermined range.

In accordance with the present invention, a relative value between the state value of each utility and a proxy value, e.g., an average value of the state values of each utility can be found for each utility. The relative values of each utility can be used to recognize the utility relatively abnormal to the other utilities on the basis of the relative value of the abnormal utility. As a result, the equipment of the present invention can recognize an abnormality in a utility caused by its environment or time change, which could not be recognized by the prior art equipment which diagnoses the utility to be abnormal or normal depending on whether or not the state value of the utility exceeds an absolute threshold.

Other objects, features and advantages of the invention will become apparent from the following description of the embodiments of the invention taken in conjunction with the accompanying drawings.

BRIEF DESCRIPTION OF THE DRAWINGS

FIG. 5 shows a flowchart of processing contents of mainly a year-by-year comparison display mode in the utility diagnosing operation of the embodiment of the invention;

DETAILED DESCRIPTION OF INVENTION

A utility diagnosing system in accordance with an embodiment of the present invention will be explained by referring to the attached drawings.

Figure 1:
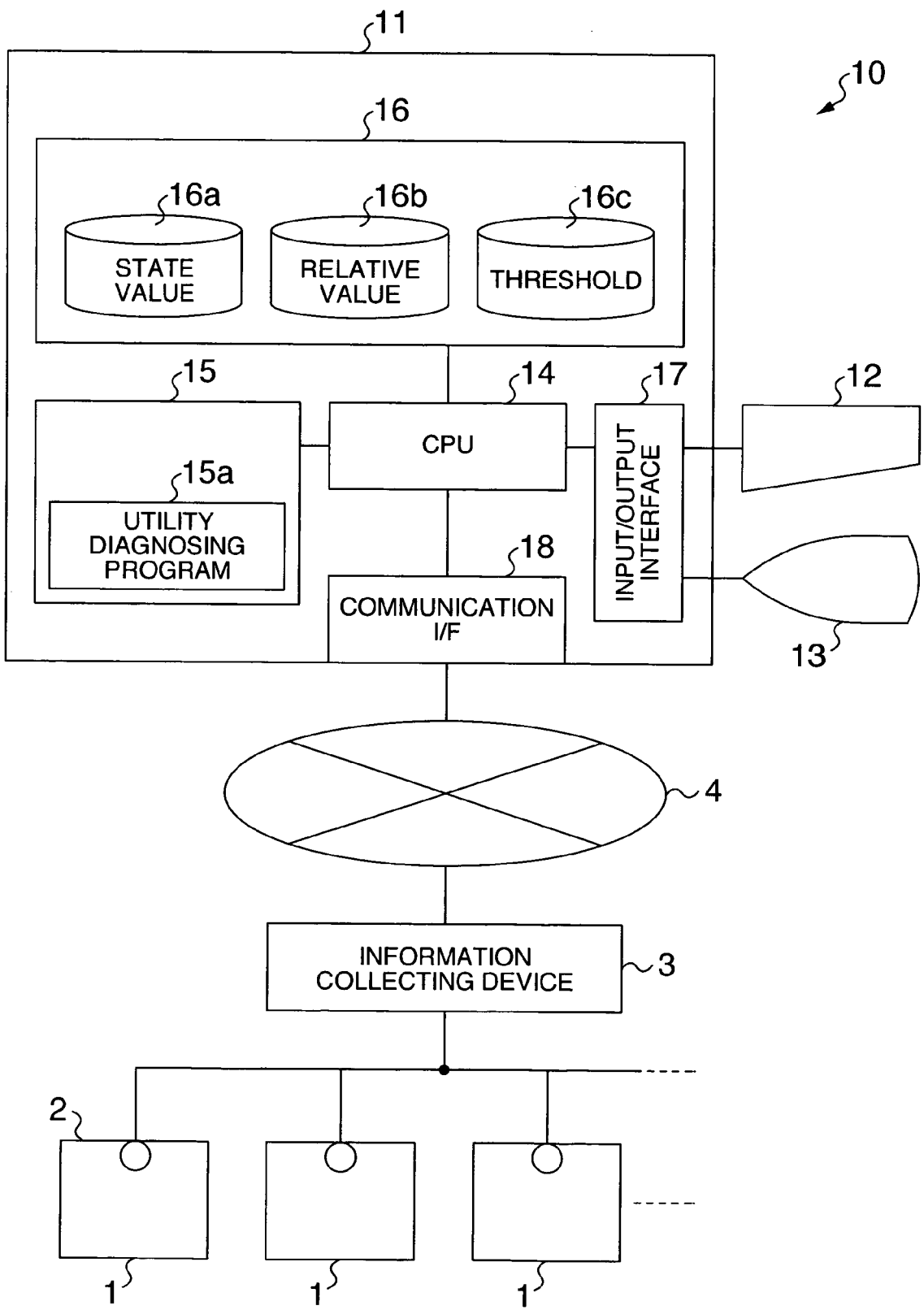
FIG. 1 is a diagram for explaining an arrangement of a utility diagnosing system in accordance with an embodiment of the present invention.

As shown in FIG. 1, the utility diagnosing system of the present embodiment diagnoses a plurality of utilities 1 of an identical type. The system comprises an information collecting device 3 for collecting state values from the utilities 1, and a utility diagnosing device 10 connected to the information collecting device 3 via a network 4. The utilities 1 to be diagnosed by the utility diagnosing system are, for example, air conditioners or the like provided in a building or the like. Each utility 1 is provided with sensors 2 for detecting a temperature, a current value, a voltage value, etc. indicative of its operating state. The information collecting device 3 collects state values from the sensors 2 of the utilities 1 and transmits them to the utility diagnosing device 10.

The utility diagnosing device 10 includes a computer main body 11, an input unit 12 for inputting various sorts of data or instructions to the computer main body 11, and a display unit 13 for displaying data according to an instruction from the input unit 12. The computer main body 11 has a CPU 14 for executing various sorts of programs, a memory 15 for storing programs, various sorts of data, and so on to be executed by the CPU 14, an external storage 16, an input/output interface 17 as an interface with the input unit 12 or the display unit 13, and a communication interface 18 for communicating with the information collecting device 3 via the network 4.

Stored in the memory 15 is a utility diagnosing program 15a for executing the operations of flowcharts shown in FIGS. 2 to 5. Stored in the external storage 16 are a state value file 16a having various state values for respective utilities written therein, a relative value file 16b having relative values (to be explained later) of the utilities written therein, and a threshold file 16c having thresholds for the relative values written therein.

The operation of the utility diagnosing device 10 explained above will next be explained by referring to flowcharts shown in FIGS. 2 to 5.

Figure 2:
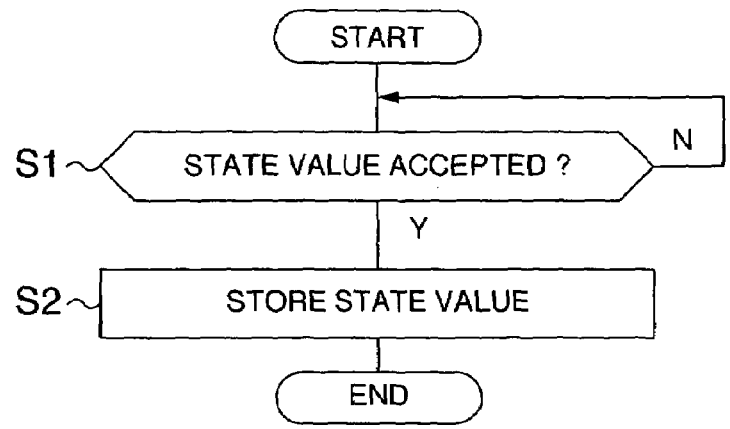
FIG. 2 shows a flowchart of state value accepting process of the utility diagnosing equipment of the embodiment of the present invention.
Figure 6:
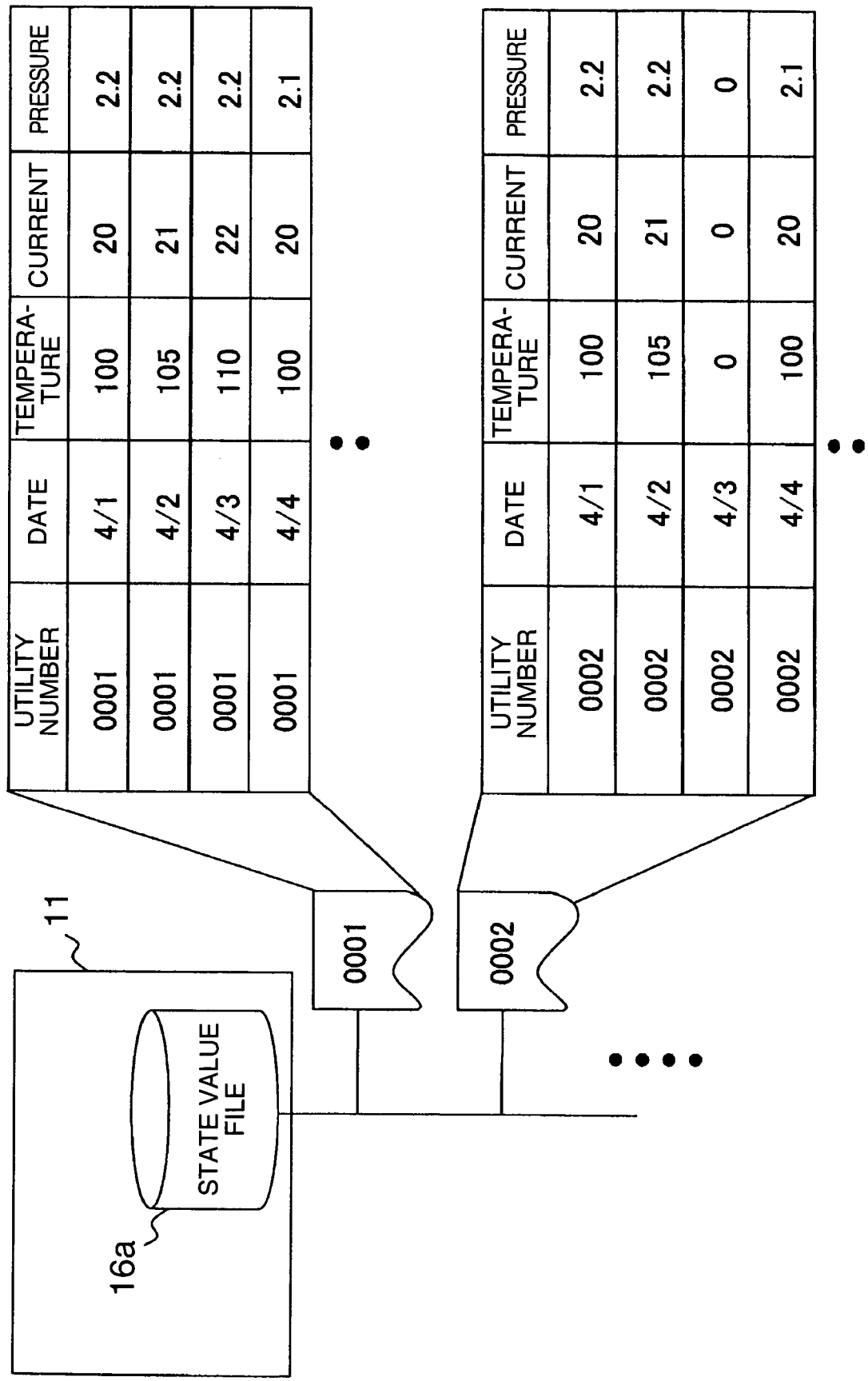
FIG. 6 is a diagram for explaining data structure of a state value file in the embodiment of the invention.

As mentioned above, the communication interface 18 of the utility diagnosing device 10 receives state values of the utilities 1 from the information collecting device 3 via the network 4, and passes them to the CPU 14. As shown in the flowchart of FIG. 2, when accepting the state values (step S1), the CPU 14 writes the state values of the utilities in the state value file 16a (step S2). From then on, the CPU 14 repetitively executes the acceptance (step S1) and writing (step S2) of the state values. Written in the state value file 16a are, as shown in FIG. 6, state values for utilities including temperature, current value, and pressure value, and times (date) at (on) which the state values are detected. In the drawing, in any of a utility number "0002" and a date "4/3", the temperature, current and pressure are all "0". This means that the utility in question is not operating.

Figure 3:
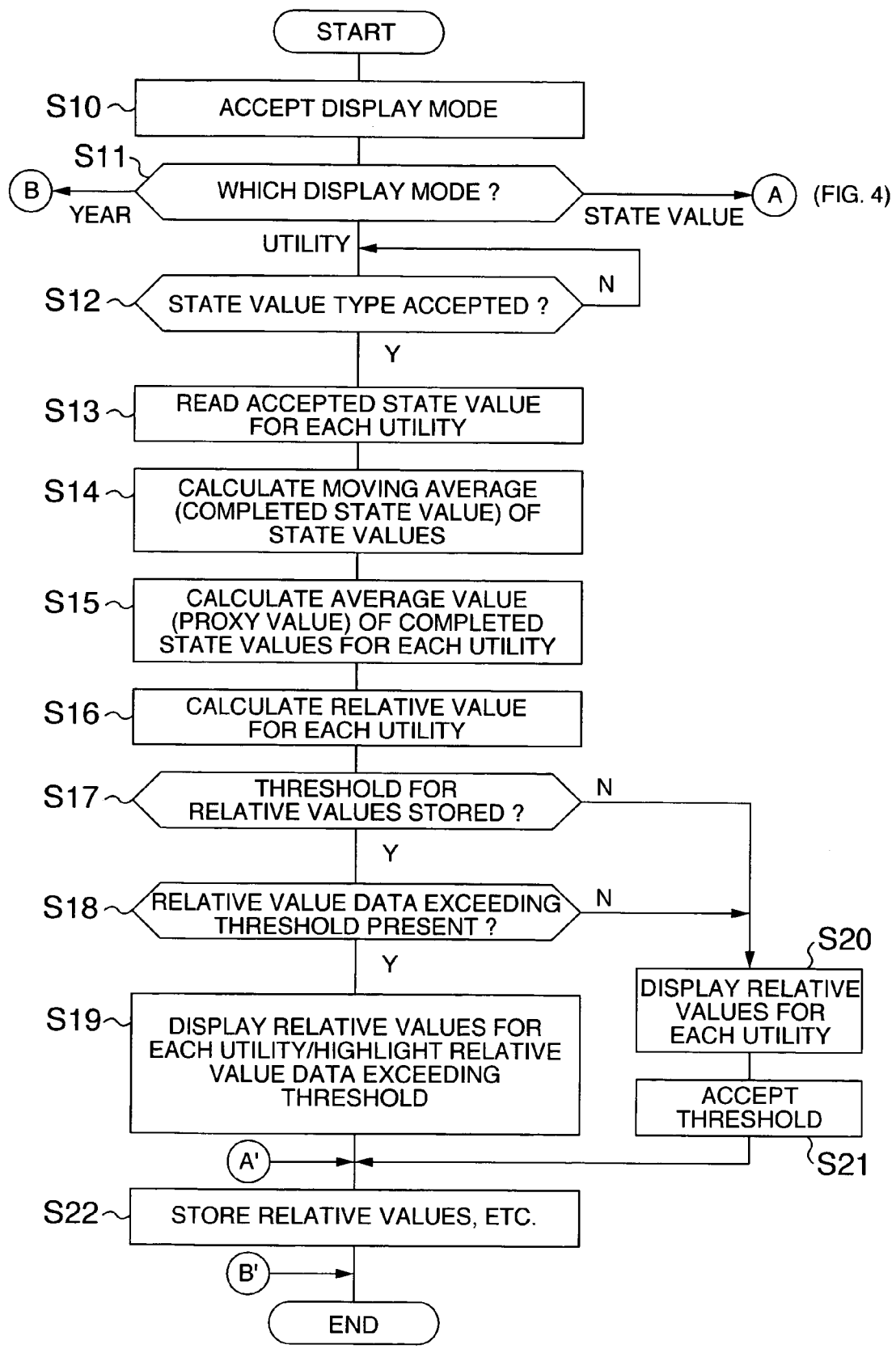
FIG. 3 shows a flowchart of mainly a utility comparison display mode in the utility diagnosing operation of the embodiment of the invention.
Figure 14:
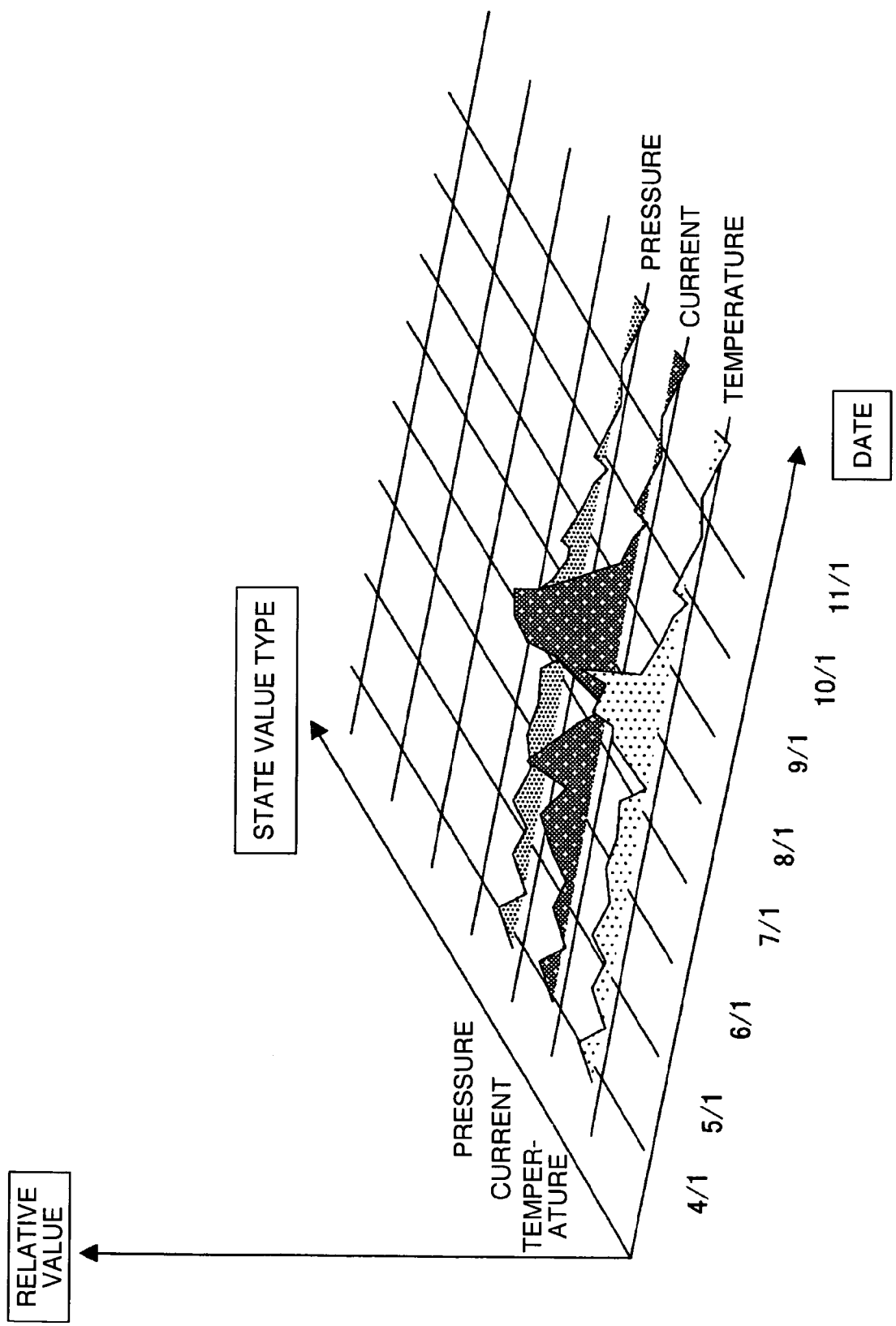
FIG. 14 is a diagram for explaining a display example of a state value comparison display mode in the embodiment of the invention.
Figure 15:
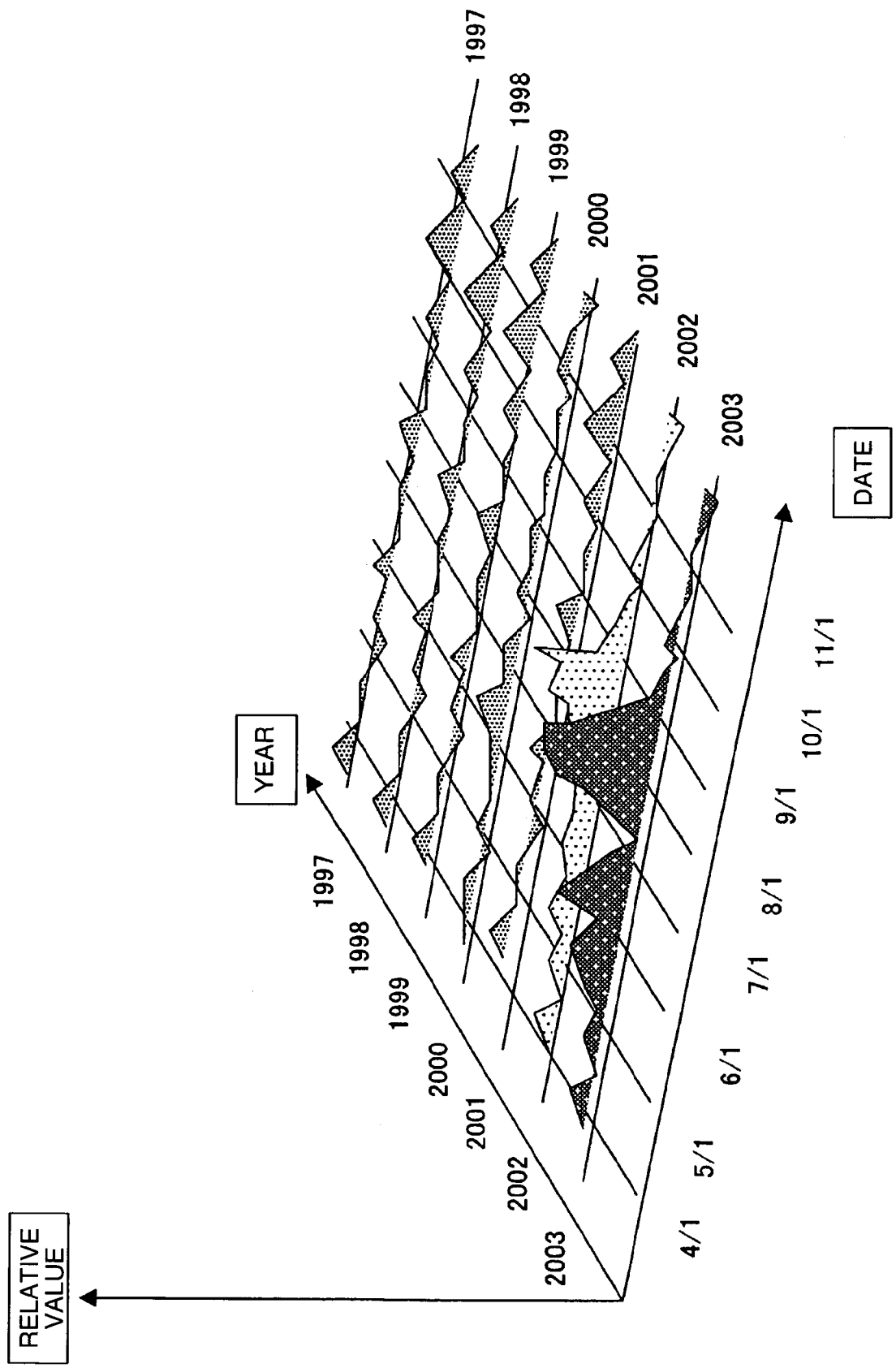
FIG. 15 is a diagram for explaining a display example of the year-by-year comparison display mode in the embodiment of the invention.

When a maintenance operator or the like wants to know the states of the utilities, the operator specifies a display mode using the input unit 12 of the utility diagnosing device 10. In the present embodiment, there are provided three display modes, that is, a utility comparison display mode in which one type of state values for the utilities are displayed to be compared with each other between the different utilities (FIGS. 8 to 13), a state comparison display mode in which one state value for one utility is displayed to be compared with another state value for the same utility (FIG. 14), and a year-by-year comparison display mode in which one type of state values for one utility in one year is displayed to be compared those for the same utility in another year, i.e., between years (FIG. 15). As shown in the flowchart of FIG. 3, the CPU 14, when receiving the display mode (step S10), decides received one of the aforementioned display modes (step S11).

Explanation will now be made in connection with an example where the maintenance operator first specifies the utility comparison display mode.

When deciding that the utility comparison display mode was instructed (step S11), the CPU 14 displays a plurality of sorts of state values on the display unit and accepts desired one of the plurality of sorts of state values desired by the maintenance operator (step S12). Next, the CPU reads out accepted state values of the utilities from the state value file 16a (step S13) and completes them. More specifically, the CPU finds a moving average of the state values of the utilities (step S14).

Figure 7B:
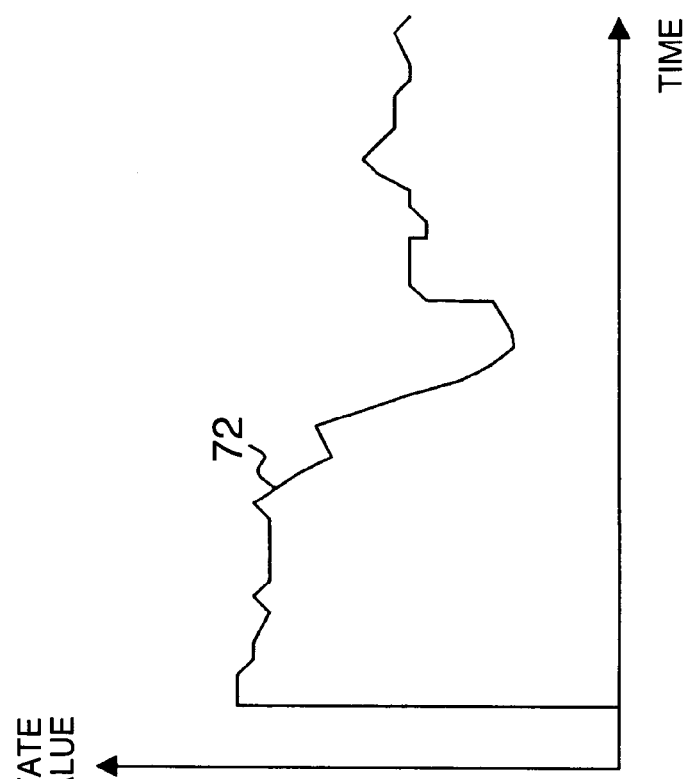
FIG. 7B shows a change in data corresponding to a completion of the state value data.
Figure 7A:
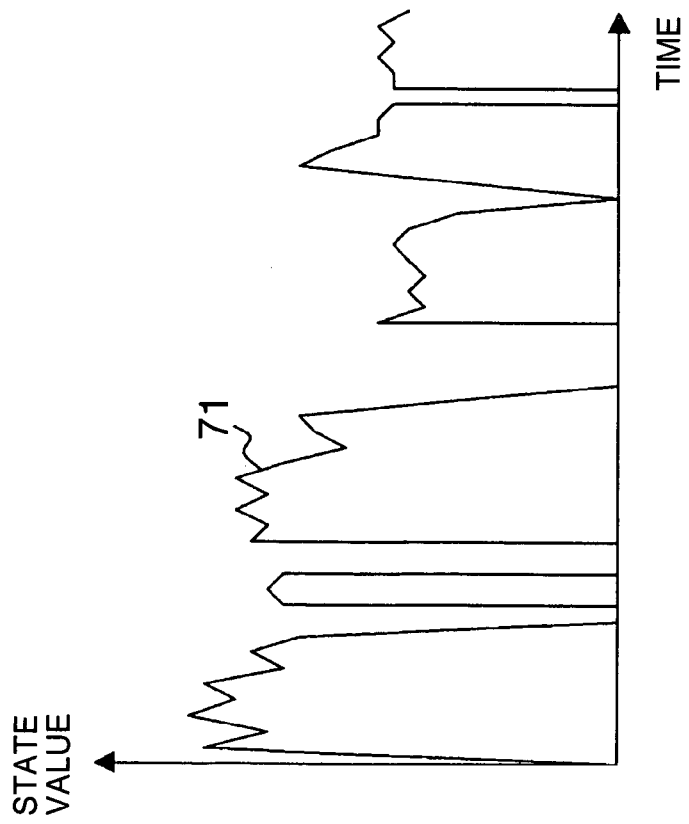
FIG. 7A shows a change in data about the state value in the embodiment of the invention.

As shown in FIG. 7A, state value data 71 received by the utility diagnosing device 10 varies with time and no data sometimes appears in the variation (locations having state values of zero in the drawing). For example, when the utility is not operating, when a utility is operating but locally faulty, or when a communication failure takes place between one utility and the utility diagnosing equipment; the utility diagnosing device 10 cannot receive its state values and thus cannot receive such state value data as mentioned above. In this way, when there is a time zone where no state value data is preset, and even when the equipment tries to perform mutual state value comparison between the utilities, the comparison is difficult. In order to avoid this, in the present embodiment, the utility diagnosing equipment finds a moving average of the state values and completes data in the time zone of no state value data to obtain continuous state value data 72 having no break or interruption, as shown in FIG. 7B.

Consider, for example, a case of finding a moving average of the state value data shown in FIG. 6. Assuming that a moving average width is "3 days", then the CPU finds a sum of state values from a date "4/1" to a date "4/3", divides the sum by the moving average width of "3 days" to find an average value, and uses the average value, for example, as a completed state value for a date of "4/2". Next, the CPU finds an average value of state values from the date of "4/2" to a date "4/4" and uses the average value as a completed state value for the date of "4/3".

As has been mentioned above, all of the state values of the date "4/3" for a utility number of "0002" are zero's and there is no state value data. When it is desired to find a completed state value for the date of "4/3", the CPU can divide the sum from the date of "4/2" to the date of "4/4" by the moving average width of "3 days" and can use the divided value as a completed state value for the date of "4/3", as mentioned above. However, for the purpose of excluding the data of "0" for the date of "4/2" having no state value data, it is desirable for the utility diagnosing device to divide a sum of the state values from the date of "4/2" to the date of "4/4" by 2 (=3−1) and use the divided value as a completed state value for the date of "4/3".

Figure 8:
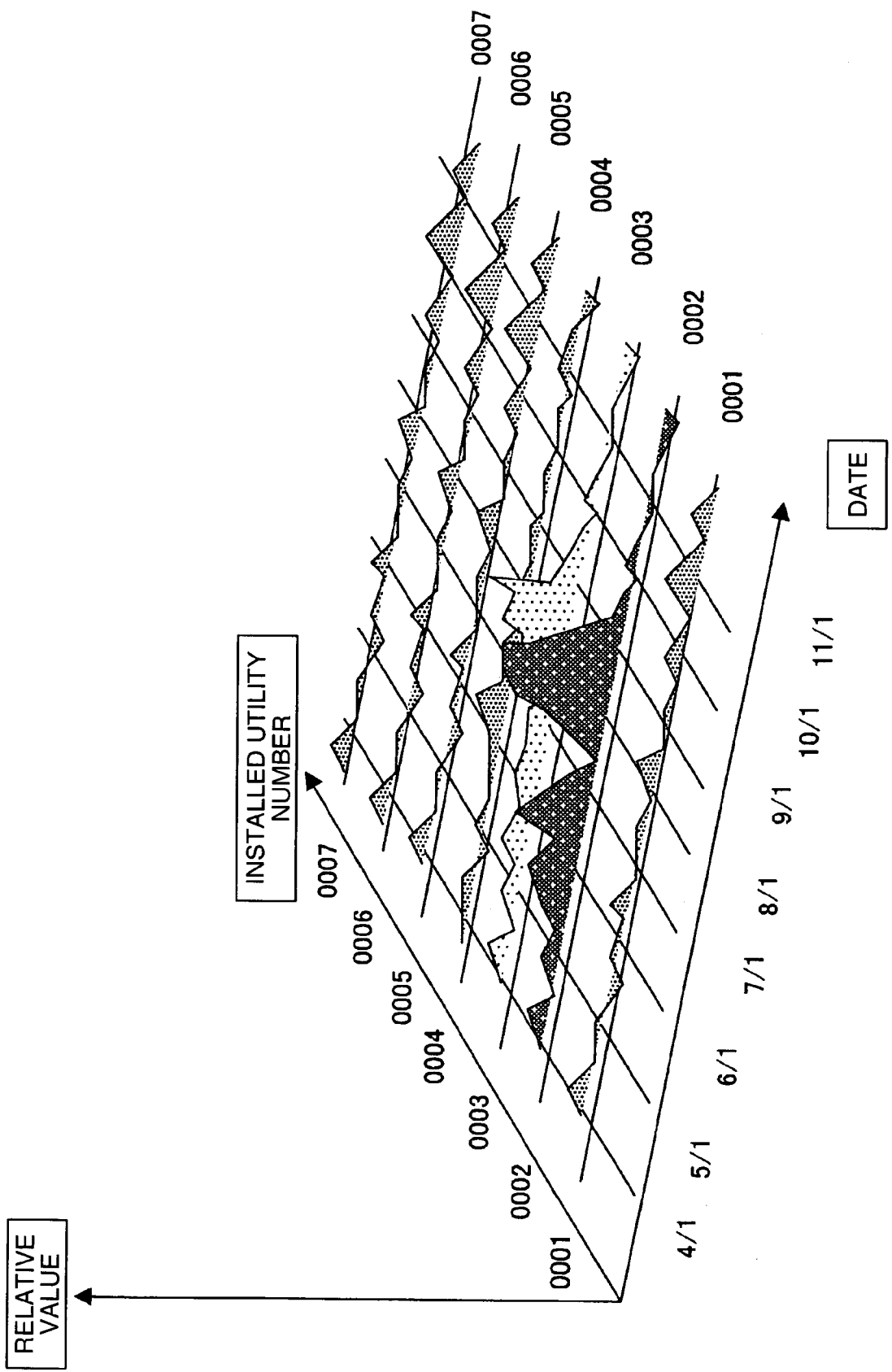
FIG. 8 is a diagram for explaining a display example of the utility comparison display mode in the embodiment of the invention.

After finishing the completing operation of the state values (step S14), the CPU finds an average value of the completed state values for the same date of the utilities, and uses the completed state-value average value as a proxy value (step S15). Next, the CPU finds a relative value between the completed state value and the proxy value having the same date for each utility (step S16). When finishing the calculation of the relative value for each date, the CPU examines whether or not a threshold relating to the relative value is written in the threshold file 16c (FIG. 1) (step S17). When the threshold is written in the threshold file 16c, the CPU decides the presence or absence of one of the relative values found in the step S16 exceeding the threshold (step S18). In the presence of the relative value exceeding the threshold, the CPU displays such a graph as shown in FIG. 8 on the display unit 13 (step S19).

More specifically, relative values at respective times for the utilities are displayed in the graph having a relative value axis using relative value as a parameter, a time axis using time (date) as a parameter, and a utility type-by-type axis using utility number as a parameter. One of the relative values exceeding the threshold is displayed to be highlighted to clearly show a utility abnormal or having the possibility of becoming abnormal.

In this way, in the present embodiment, one of a plurality of utilities of an identical type which is relatively abnormal is clearly shown as an abnormal utility. Thus an abnormality or a normality of an utility can be recognized, which abnormality has been unrecognizable by the device which diagnoses the utility to be abnormal or normal depending on whether or not its state value exceeds an absolute threshold. More in detail, as mentioned above, when an absolute threshold relating to the operating temperature of the utility is already set, the utility cannot be recognized, in some cases, to be abnormal even when the utility installed in a cold district has an abnormally-high operating temperature. To the contrary, when the utility is installed in a tropical district, the utility cannot be recognized, in some cases, to be abnormal even when the utility has an abnormally-low operating temperature. Further, even when a utility deteriorated with time passage has an abnormal state value, the utility cannot be recognized, in some cases, to be abnormal. However, such a state can be recognized in the present embodiment.

When finishing the display of the relative values, etc. (step S19), the CPU writes relative values at respective times in the relative value file 16b (FIG. 1) and, when one of the relative values exceeding the threshold, the CPU also writes the fact in the relative value file 16b (step S22) and completes a series of operations.

Figure 9:
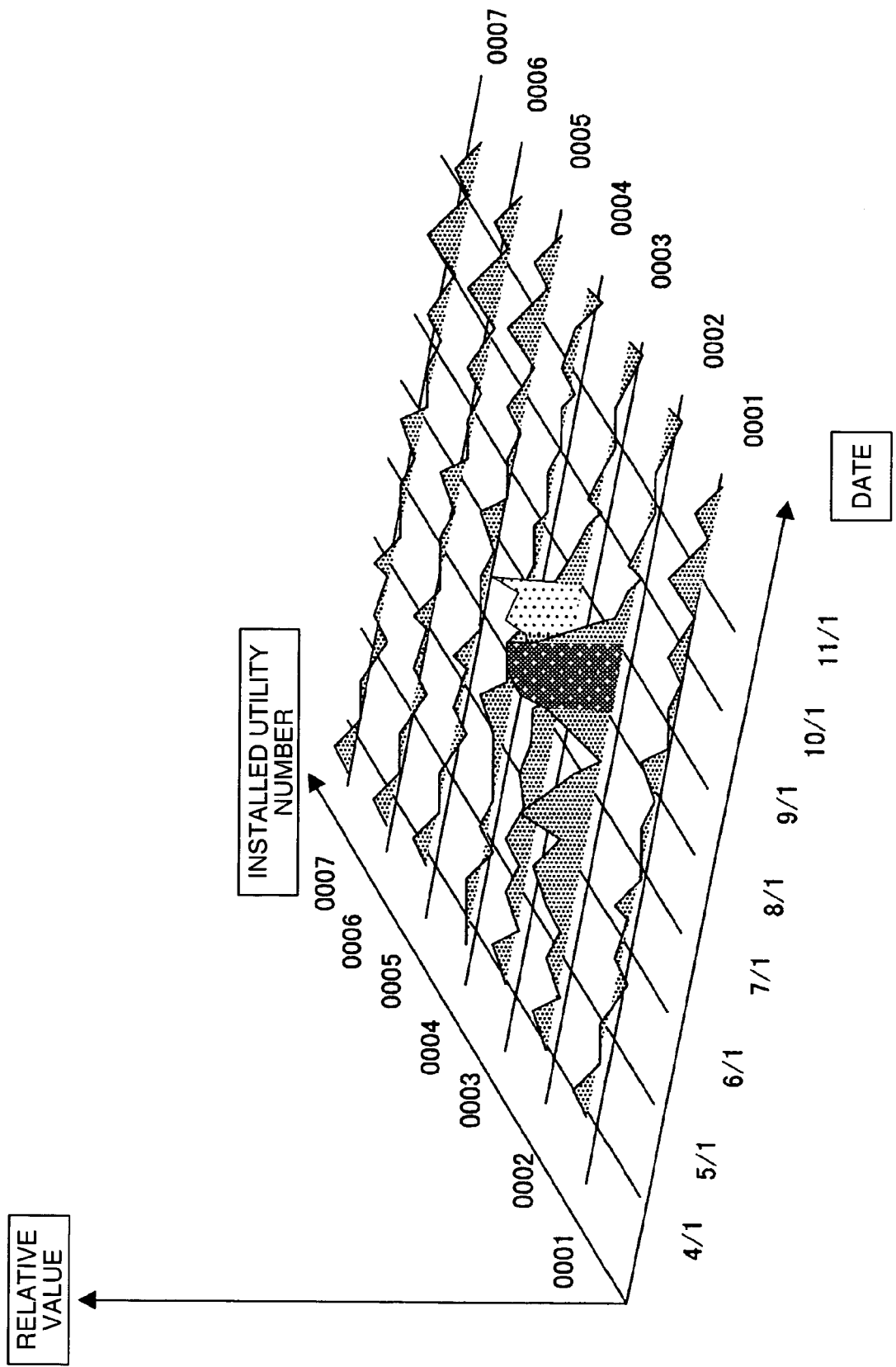
FIG. 9 is a diagram for explaining a modification of the display example of the utility comparison display mode in the embodiment of the invention.

When the CPU 14 decides in the step S17 that the threshold is not written in the threshold file 16c, and when the CPU decides in the step S18 the absence of any of the relative values exceeding the threshold, the CPU 14 displays relative values at respective times for each utility on the display unit 13 while not displaying such a highlighted relative value as shown in FIG. 9 (step S20). In this way, even when an abnormal relative value is display not to be highlighted due to the fact that the threshold is not set, the maintenance operator or the like can recognize the relatively abnormal utility when compared with the other utilities on the basis of display contents in the present embodiment. Thus, an abnormality or a normality, which has been unrecognizable by the device which diagnoses the utility to be abnormal or normal depending on whether or not its state value exceeds an absolute threshold, can be recognized.

Next, while displaying the graph showing relative values for the utilities, the CPU 14 prompts the maintenance operator to enter a threshold for the relative value of the state value (step S21). At this time, the CPU decides in the step S18 that there is no one of the relative values exceeding the threshold. And when the CPU proceeds to the step S21, the threshold is already set. Thus, the CPU 14 accepts the threshold, displays whether or not to update the already-stored threshold to a new threshold, and in response to the input of an update instruction, the CPU stores the new threshold in the threshold file

16c. And the CPU goes to the aforementioned step S22 and stores the relative value or the like in the relative value file 16b.

Explanation will then be made in connection with a case when the maintenance operator or the like specifies the state comparison display mode.

Figure 4:
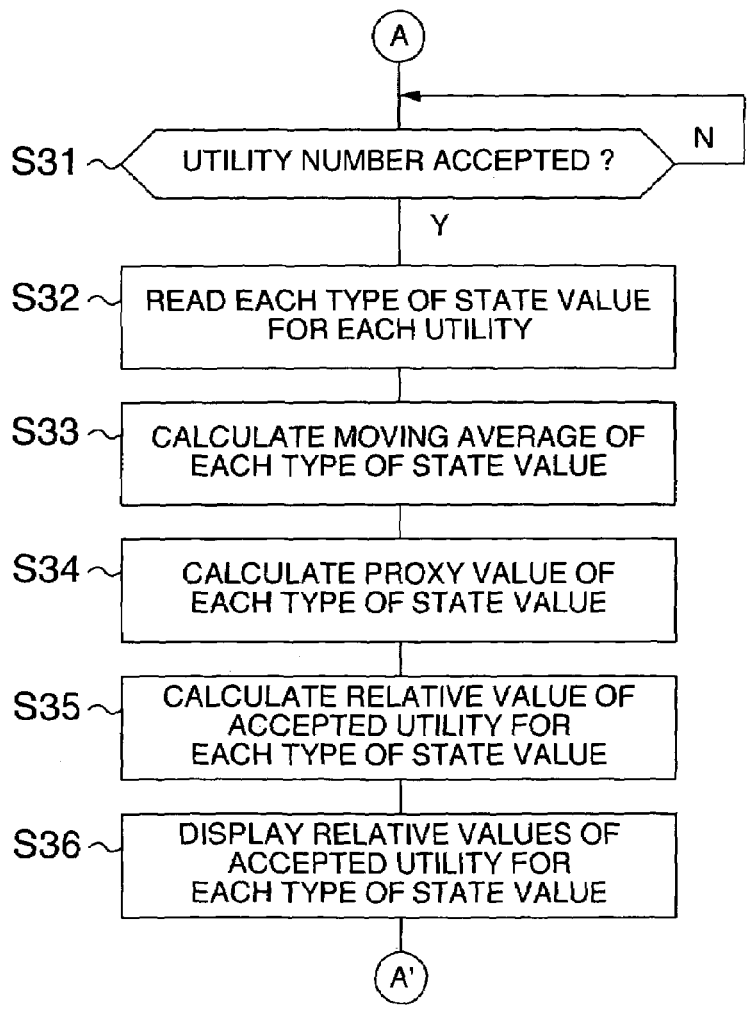
FIG. 4 shows a flowchart of mainly a state comparison display mode in the utility diagnosing operation of the embodiment of the invention.

The CPU 14, upon deciding that the state comparison display mode was specified, prompts the operator to enter desired utility numbers via the display unit, and accepts the desired utility numbers for displaying data relating to the utilities, as shown in a flowchart of FIG. 4 (step S31). The CPU 14 then reads out various types of state values of the utilities from the state value file 16a (step S32), and performs completing operation similar to the operation of the step S14 over the state values of the utilities for each state value type, that is, finds a moving average (step S33).

After finishing the completing operation of the state values of each utility for each state value type (step S33), the CPU finds an average value of the completed state values of the utilities of the same date for each state value type and uses the average value as a proxy value (step S34). The CPU then finds a relative value between each state value of the utility having the utility number accepted in the step S31 and the corresponding proxy value for each type of state value (step S35), displays such a graph as shown in FIG. 14 on the display unit 13, and stores the relative value in the relative value file 16b (step S22).

Displayed on the display unit 13 in this case are the time-series relative values of each type of state values of the accepted utility in a graph including a relative value axis having relative value as a parameter, a time axis having time (date) as a parameter, and a state value type axis having state value types as parameters. In this case, with respect to the relative values for each state value type, when a difference (absolute value deviation) between a maximum and minimum of the relative values is small, it becomes hard for the maintenance operator to recognize a change in the relative value. To avoid this, the magnitudes of the relative values for each state value type are adjusted so that the relative value deviations of the state value sorts become the same, and then the relative values are displayed.

In the illustrated example, decision of whether or not each relative value exceeds the corresponding threshold is not made. However, such operations as in the steps S17 and S18 may be carried out so that, if one of the relative values exceeding the corresponding threshold is present, then the relative value is highlighted.

Explanation will next be made in connection with a case when the maintenance operator specifies the year-by-year comparison display mode.

Upon deciding that the year-by-year comparison display mode was instructed in the step S11, the CPU 14 prompts the operator to enter a desired utility number via the display unit, and accepts the desired utility number to display desired one of the utilities (step S41), as shown in a flowchart of FIG. 5. Further, the CPU prompts the operator to enter desired one of the state value types via the display unit, and accepts the desired value type to display the relative values of the desired state value type (step S42). Next, the CPU refers to the threshold file 16c and decides whether or not accepted relative values of the utility of the accepted number are stored therein (step S43). When the accepted relative values of the utility are not stored in the file, the CPU displays data indicative of absence of relative values data and terminates its operation. When the accepted relative values of the utility are stored in the threshold file 16c, the CPU reads out the relative value of the utility from the threshold file 16c, and displays such a graph as shown in FIG. 15 on the display unit 13.

More specifically, relative values at times for years in a graph including a relative value axis having relative value as a parameter, a time axis having time (date) as a parameter, and a year-by-year axis having year as a parameter. In this case, when data indicative of the presence of one of accepted relative values exceeding the threshold is stored in the threshold file 16c, the relative value of the year including the time (date) exceeding the threshold is highlighted. In this way, by comparing histories of past state values in different years, the operator can recognize a tendency of the utility with time passage or a sign of abnormality.

In the illustrated example, relative values for different years are displayed in this display mode. However, this is merely an example. For example, relative values for different days, different weeks or different months may be displayed.

Modifications of a display example in the utility comparison display mode will be explained with reference to FIGS. 9 to 13.

A first modification will be explained by referring to FIG. 9.

In the previous embodiment, as shown in FIG. 8, the color of all relative values of the utility exceeding the threshold is changed to be different from the color of the other data. In the first modification, however, the color of only some of the relative values exceeding the threshold are changed to be different from the color of the other data, as shown in FIG. 9. When the data is displayed in this way, the maintenance operator can easily recognize which utility became abnormal.

Figure 10:
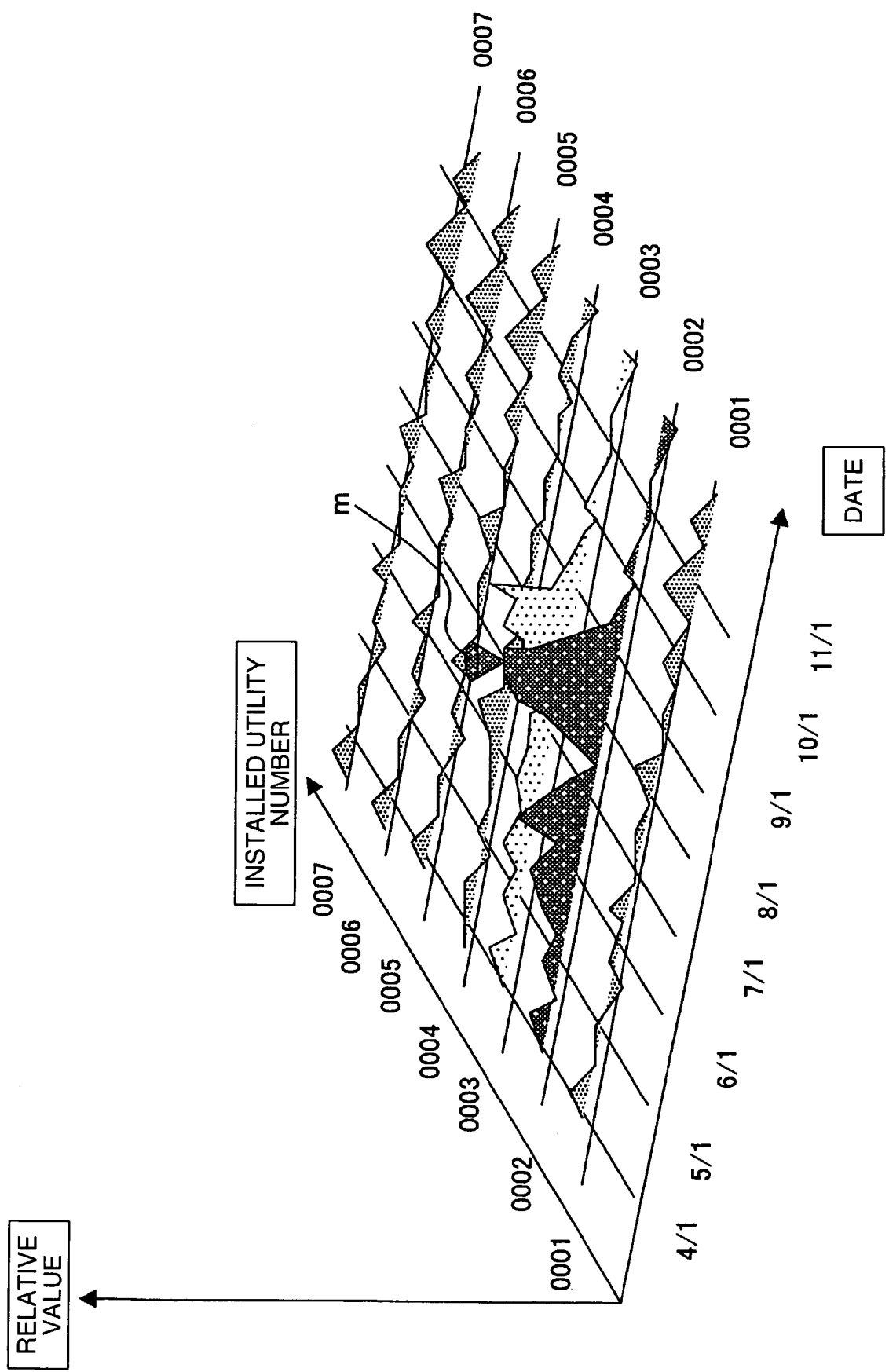
FIG. 10 is a diagram for explaining a second modification of the display example of the utility comparison display mode in the embodiment of the invention.

Explanation will then be made as to a second modification by referring to FIG. 10.

In the second modification, as in the previous embodiment, the color of all data of relative values for only one of the utilities exceeding the threshold is changed to be different from the color of the other data for easy recognition of the abnormal utility, and part of the relative value data exceeding the threshold is denoted by a mark 'm' for easy recognition of the time at which the abnormality occurred therein.

Figure 11:
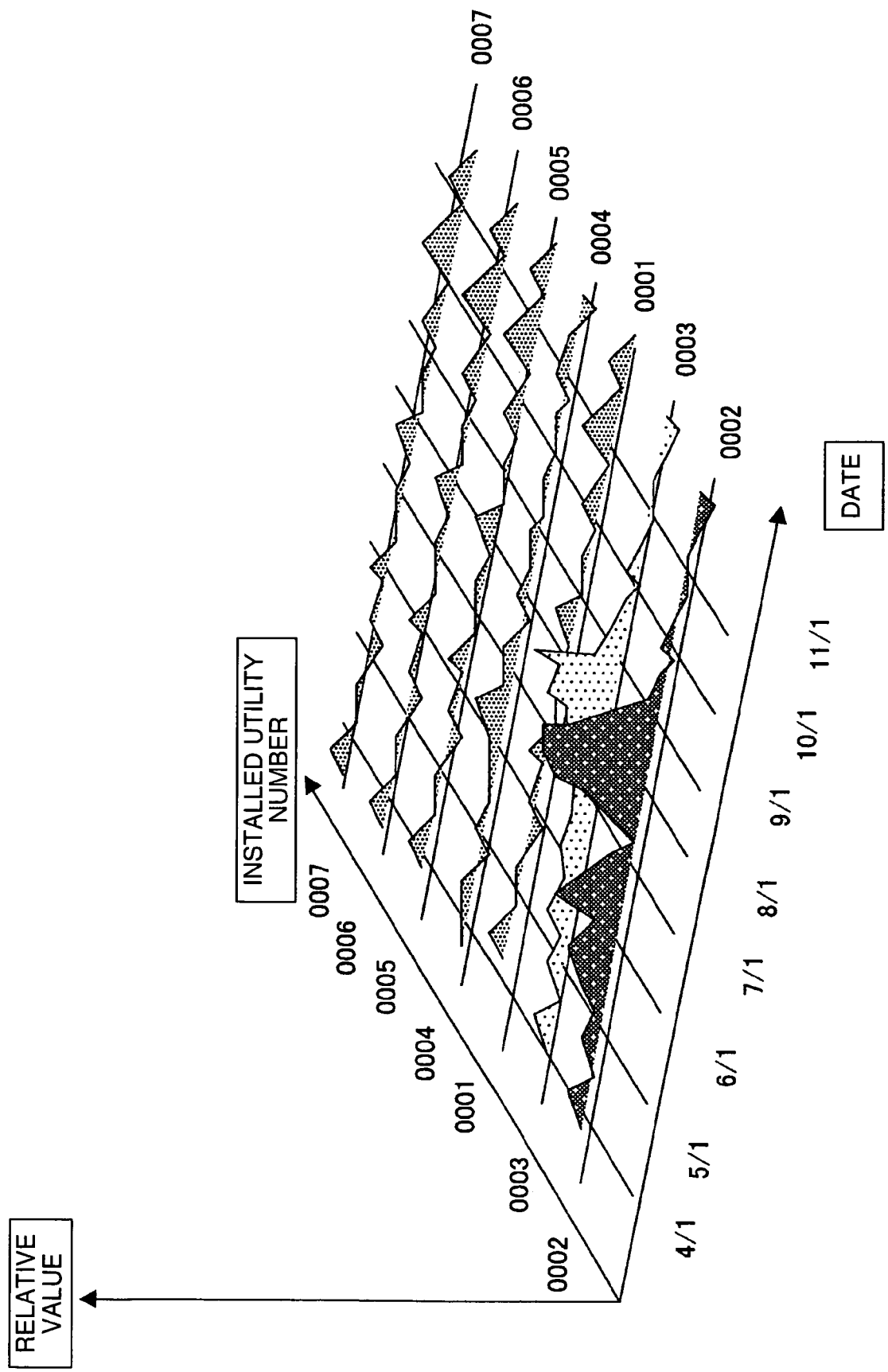
FIG. 11 is a diagram for explaining a third modification of the display example of the utility comparison display mode in the embodiment of the invention.

A third modification will next be explained with reference to FIG. 11.

The third embodiment is arranged, similarly to the foregoing embodiment, to change the color of all data of relative values of utilities exceeding the threshold to another color different from the other data and to position the color-changed relative value data of the utility at the nearer side of the operator. When such a display is realized, the operator can recognize one of the utilities to be noted at a glance and can easily observe changes in the relative values of the utility.

Figure 12:
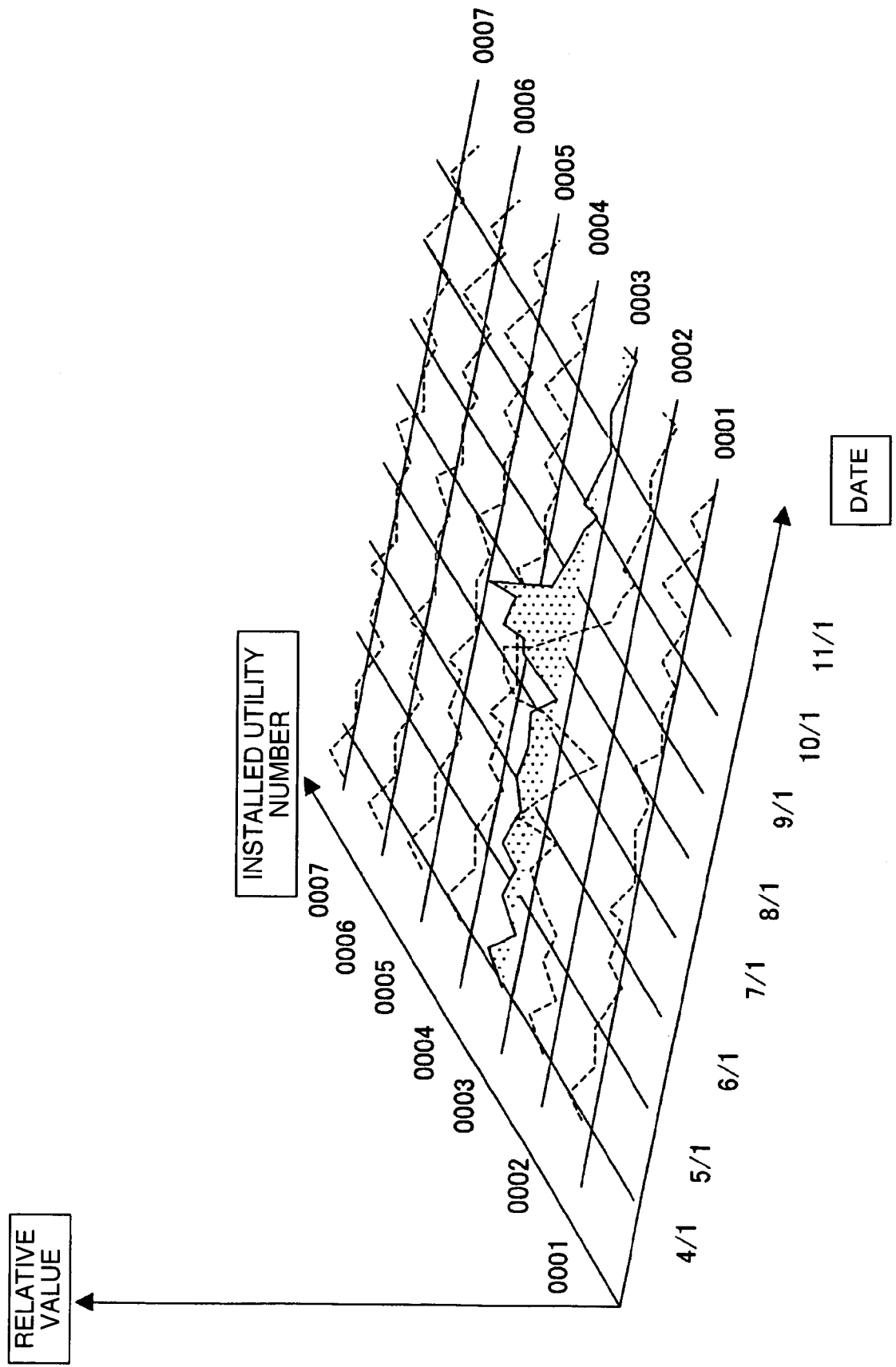
FIG. 12 is a diagram for explaining a fourth modification of the display example of the utility comparison display mode in the embodiment of the invention.

Explanation will then be made as to a fourth modification with reference to FIG. 12.

Only some of the relative values of the utilities exceeding the threshold have been highlighted in the foregoing embodiment. However, this modification is arranged to highlight the relative values of a specified utility by an operator who operates the input unit 12. In this connection, the illustrated highlighted display mode includes (1) a mode in which data about the relative values of the specified utility is shown by a solid line and data about the relative values of the other utilities are shown by dashed lines or are not shown, (2) a mode in which the color of data about the relative values of the specified utility is displayed to be different from the color of the other utilities, and (3) a mode in which data about the relative values of the specified utility is displayed at the side of nearer to the operator than data about the relative values of the other utilities.

In any of the foregoing embodiment shown in FIG. 8 and the aforementioned modifications, part of the relative value data displayed at a side farther from the operator is, in some cases, hidden by the relative value deviation displayed at a most front side of the operator. In order for the operator to reliably observe all the data of the relative values of the desired utility, the present modification is arranged to highlight data about the relative values of the specified utility. In this modification, since it is impossible or difficult to observe the data of the relative values of the utilities other than the specified utility, it becomes hard to compare the data of the specified utility with the data of the other utility. Thus, when there is a utility, the relative value data of which the operator cannot see easily during the display of the relative value data on the display unit in the foregoing embodiment and in the aforementioned modifications; it is preferable as in the present modification to highlight the data on the relative values of the utility specified by the maintenance operator.

Figure 13:
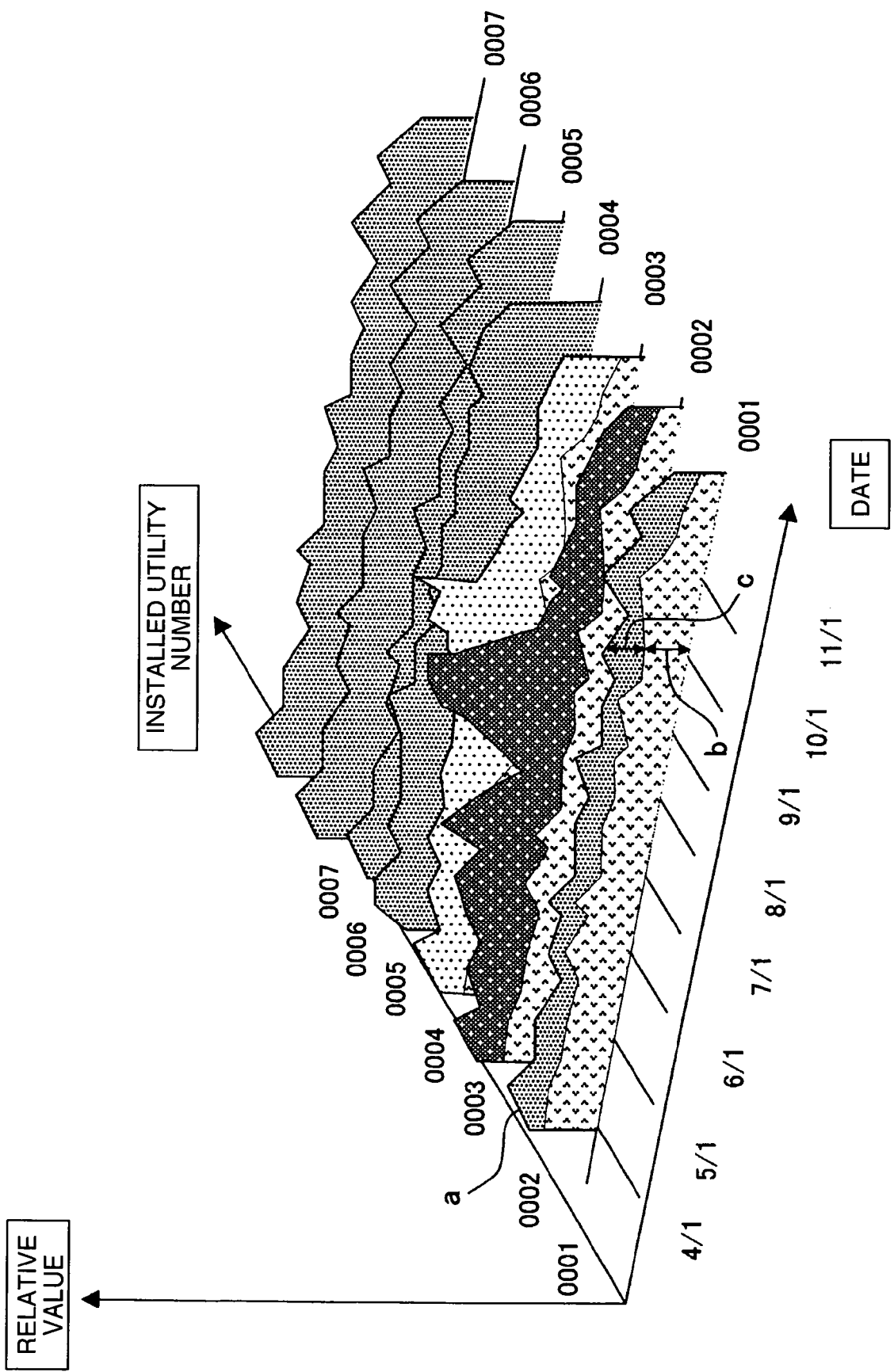
FIG. 13 is a diagram for explaining a fifth modification of the display example of the utility comparison display mode in the embodiment of the invention.

Explanation will next be made as to a fifth modification with reference to FIG. 13.

In this modification, unlike the foregoing embodiment and the above modifications, a graph including a state value axis having completed state value as a parameter, a time axis having time (date) as a parameter, and a utility type-by-type axis having utility number as a parameter, is displayed. And data a about time-series completed state values is displayed for each utility, a region b of the state values corresponding to its proxy value and a region c thereof corresponding to its relative value are displayed with different colors.

The present modification is advantageous in that the completed state values and proxy value data, in addition to the relative value data, can be seen. However, the present modification is not suitable when it is desired to make comparison in relative value between utilities. Meanwhile, the foregoing embodiment and the above first modification, etc. cannot see the data about completed state values and proxy value, but can suitably make relative value comparison between utilities. For this reason, it is preferable that a utility comparison display mode include a mode in which the completed state value data and the proxy value data in addition to the relative value data can be seen for each utility as in the present modification, and a mode in which only the relative value data can be displayed for each utility as in the foregoing embodiment or in the first modification, etc.

Another display example of the relative values explained above will next be explained by referring to FIGS. 16 and 17.

In the foregoing embodiment, a relative value is found from a completed state value and a proxy value. The completed state value data is made by the completion of data of a time zone in which no state value data was actually obtained. Since the completed state value data includes data about the time zone in which a state value is not actually sampled, even the relative value data includes data about the time zone in which a relative value is not actually sampled.

Figure 16:
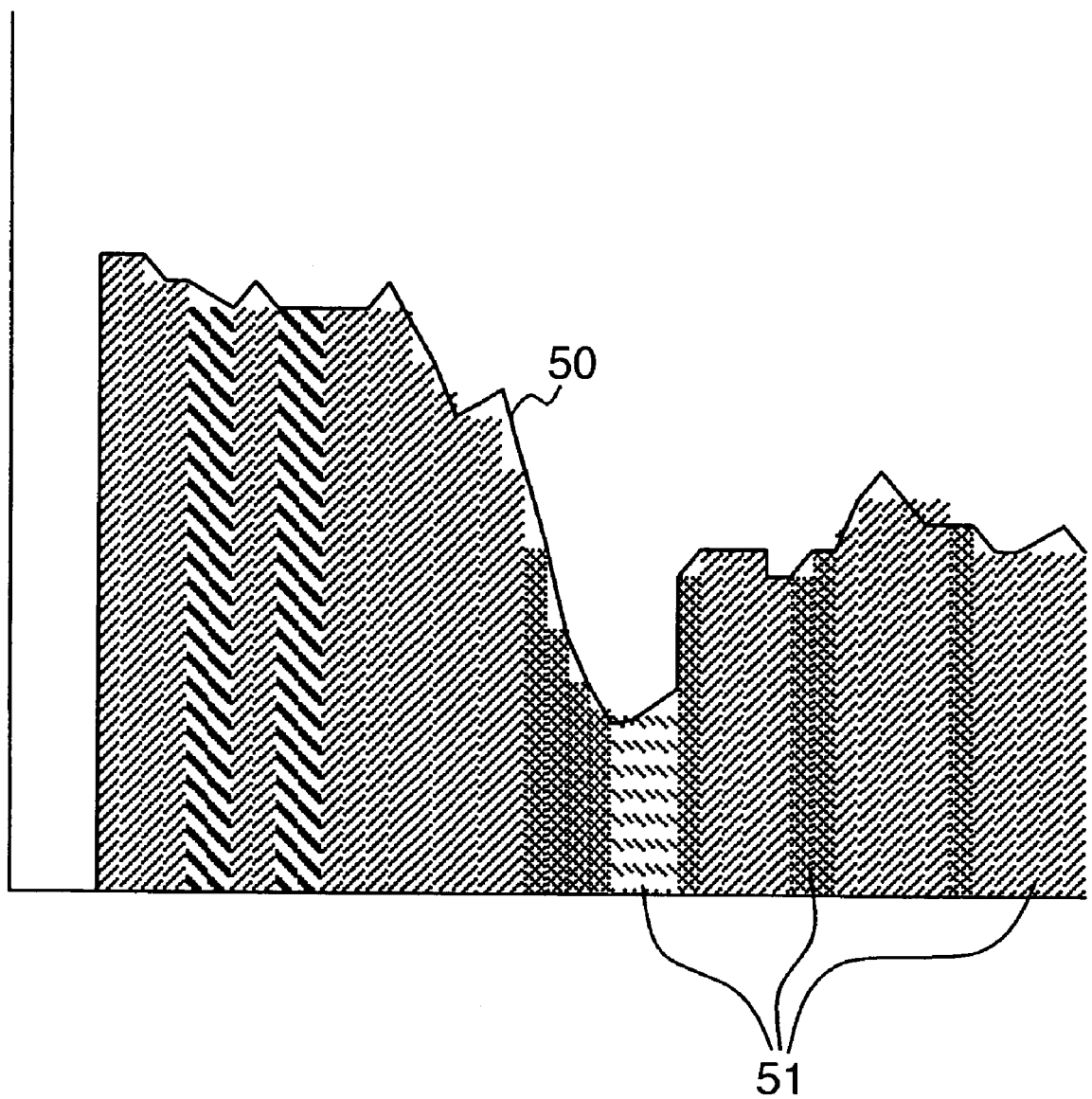
FIG. 16 shows another display example of a relative value in the embodiment of the invention.

In order to make clear between the data about the relative value based on the actually sampled data and the data about the relative value based on the not-sampled data, different zones are displayed with different colors 51 according to the sampling density for easy observation of different sampling densities in a data region 50 indicative of relative values, as shown in FIG. 16.

Figure 17:
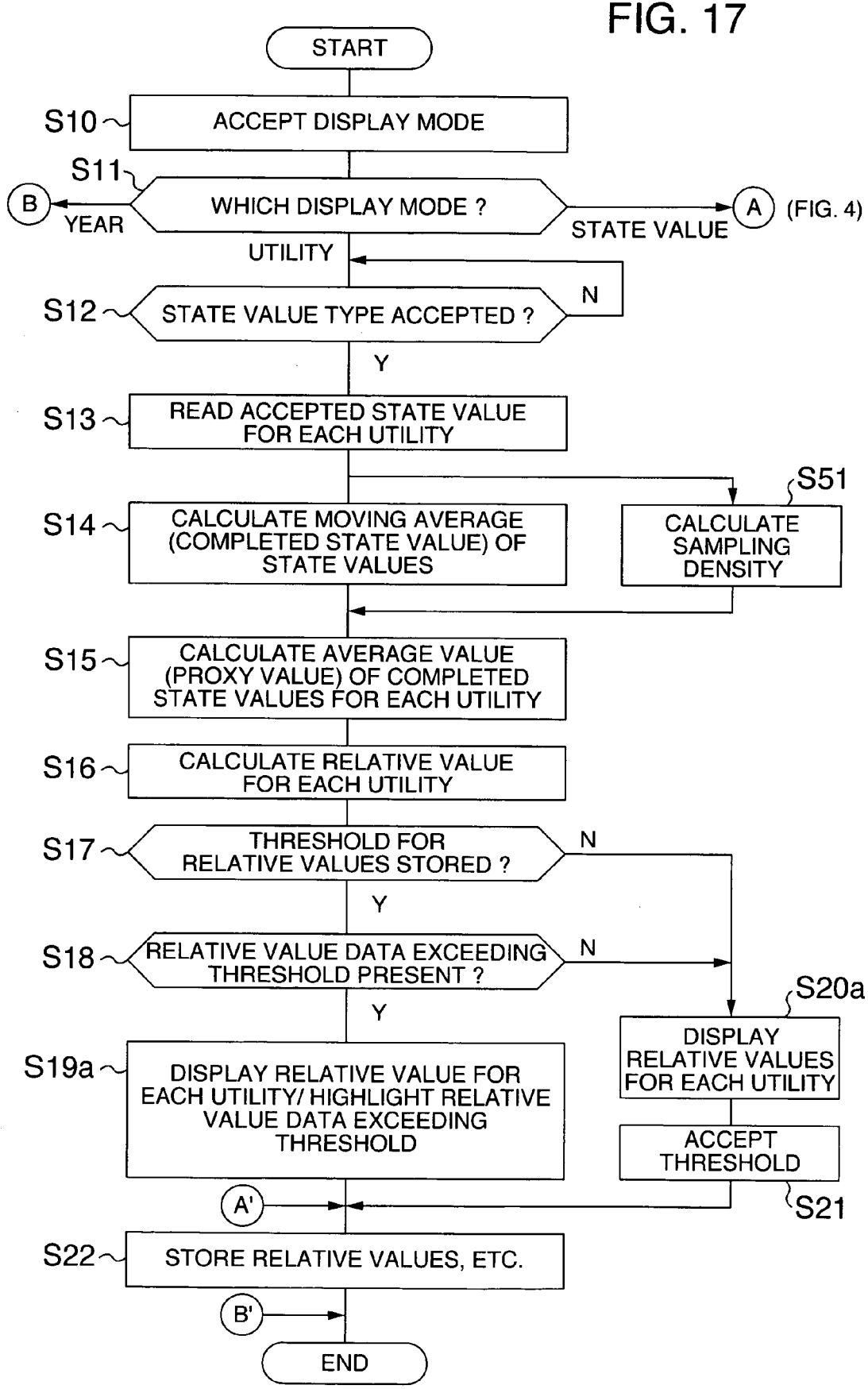
FIG. 17 shows a flowchart of processing contents of the utility comparison display mode for executing the display shown in FIG. 16.

For the purpose of displaying zones with different colors according to the sampling density in this way, a step S51 of finding the sampling density of a state value concurrently with the operation of the step S14 in the flowchart of FIG. 3 is required as shown in FIG. 17. When it is desired to find the sampling density, a sampling number for a state value for each predetermined time width is obtained and the sampling number is used as a sampling density. In steps 18a and 20a after the sampling density is found, the data region indicative of relative values is displayed with different colors as mentioned above.

When the relative value data region is displayed with different colors according to the sampling density as mentioned above, a too large amount of information are included in the graph and the operator cannot observe the graph clearly in the display example of FIG. 8. For example, when it is desired to enhance and display relative values about one state value type for one utility as in the display example of FIG. 12, the relative value data region is displayed with different colors according to the sampling density.

Next, an example of acquiring the threshold mentioned above will be explained with reference to FIG. 18.

In the utility comparison display mode of the foregoing embodiment, the maintenance operator enters a threshold for relative values while seeing the relative value graph. In this example, the threshold is automatically created.

It is assumed in this example that at least one of a plurality of utilities is provided a self diagnosing function. When the utility exhibits an abnormal state value, the utility transmits to the utility diagnosing equipment not only the abnormal state value but also its detection time, and information indicating that the state value is abnormal, such as an abnormality indicating flag or abnormality type information indicative of the abnormality contents. Accordingly, not only the utility numbers, the detection times (dates), and the state values but also information indicative of whether or not the state value is abnormal are stored in the state value file 16a (FIG. 6) of the utility diagnosing equipment. In the step S13 in the flowchart of FIG. 3, the CPU 14 reads out not only a utility number, a detection time, and a state value but also information indicative of whether or not the state value is abnormal, from the state value file 16a.

Figure 18:
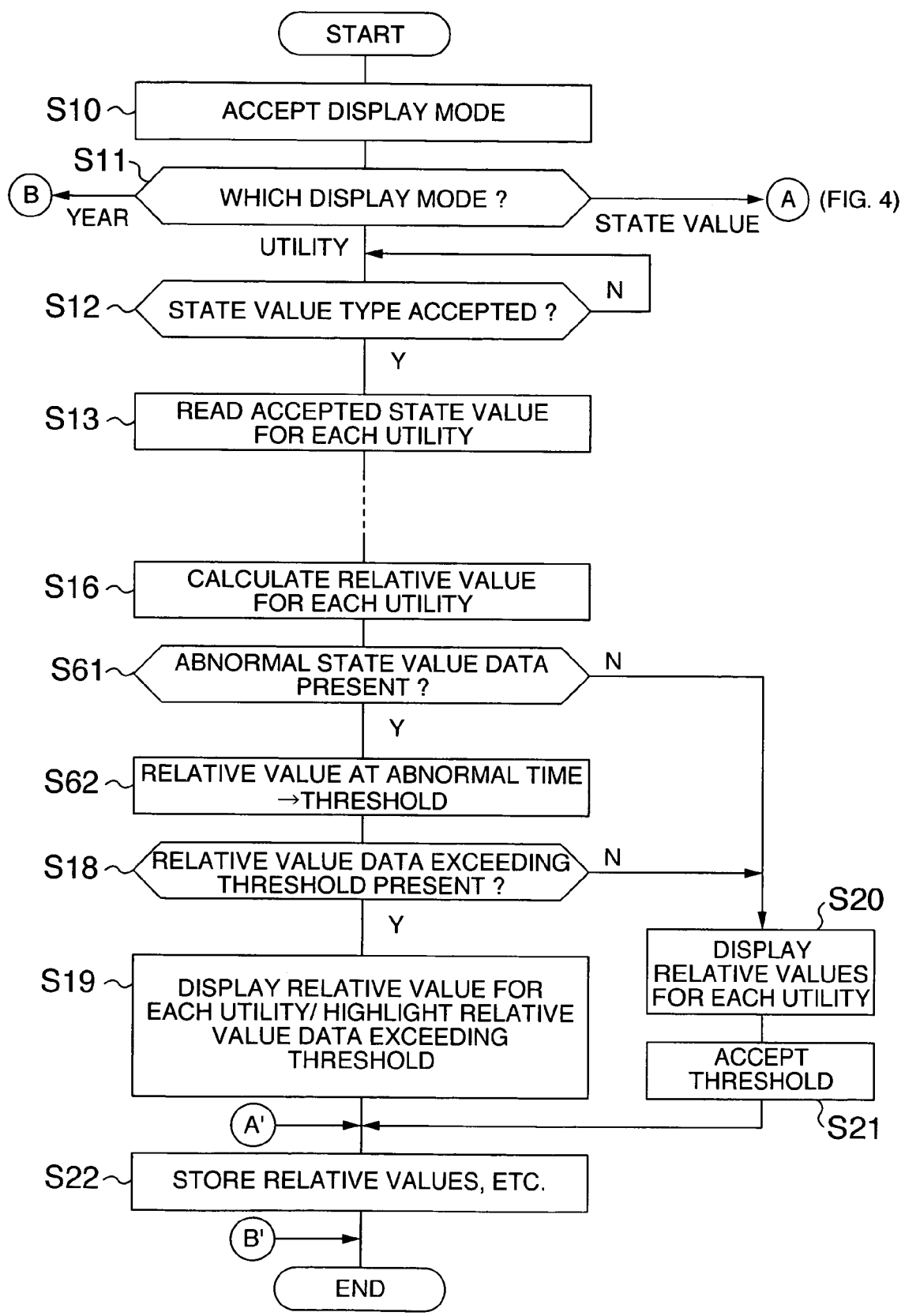
FIG. 18 shows a flowchart of threshold processing contents of the utility comparison display mode in the embodiment of the invention.

As shown in the flowchart of FIG. 18, in the present example, when the relative value calculation of the step S16 in the foregoing embodiment is finished, it is decided the presence or absence of abnormal one of state values read out in the step S13 (step S61).

In the absence of an abnormal state value, the CPU proceeds to the step S20 in the foregoing embodiment and displays relative values for each utility. In the presence of an abnormal state value, the CPU uses the relative value at the abnormal time as a threshold, that is, executes the allowable range setting step and the allowable range acceptance step (step S62). When a self diagnosing function is provided in each of a plurality of utilities and the utility diagnosing equipment receives information indicative of abnormal state values from the plurality of utilities, the equipment decides, as a threshold, a minimum or maximum of the relative values at abnormal times from the abnormal utilities, or an average value of the relative value at the abnormal times of the abnormal utilities. Whether or not to use any of the minimum, maximum, and average value as the threshold depends on the corresponding state value or the level of quality of utility operation/maintenance.

After deciding the threshold (step S62), the CPU proceeds to the step S18 in the foregoing embodiment and decides the presence or absence of one of the relative values exceeding the threshold. In the subsequent steps, the CPU performs operations similar to in the foregoing embodiment.

The threshold automatically set in the present example is not a value determined as a result of mutual comparison of relative values for each utility but a value based on the abnormal information obtained from one or a plurality of utilities.

Thus, the threshold cannot be used as a threshold for decision of whether or not the utility or utilities are relatively abnormal to the other utilities. For this reason, in the present example, the utility abnormality decision based on the automatically set threshold is used basically as a preliminary decision criterion, and it is preferable for the maintenance operator additionally to provide a step of entering a threshold for relative values for each utility while observing the relative value data and to use the threshold entered in the step preferentially to the automatically set threshold.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A utility diagnosing equipment for diagnosing a plurality of utilities of an identical type on the basis of state values from the utilities, comprising:
    state value accepting means for accepting said state values from said plurality of utilities;
    state value memory means for storing, for each utility, a time-series state value of each utility;
    completing means for estimating a missing state value in the time-series state value of each utility stored in said state value memory means;
    proxy value calculating means for taking statistics of the state values from said respective utilities to calculate a proxy value representative of states of each utility;
    relative value calculating means for finding a relative value for each utility between the state value of each utility and said proxy value; and
    output means for outputting said relative value for each utility and/or utility identification information about the utility when said relative value exceeds a predetermined range;
    wherein said proxy value calculating means calculates a completed proxy value at each time as said proxy value with use of the state value at each time estimated by said completing means, and said output means outputs said relative value for each utility and/or utility identification information about the utility when said relative value exceeds a predetermined range; and
    wherein said completing means finds a moving average of the state values of the utilities at the respective times as a moving average width of a predetermined time width and completes the missing state value.

2. A utility diagnosing equipment according to claim 1, wherein said proxy value calculating means uses the average value of the state values of the utilities at the respective times completed by said completing means as said completed proxy value at each time.

3. A utility diagnosing system comprising:
    utility diagnosing equipment set forth in claim 1; and
    an information collecting device for collecting said state values from the utilities and transmitting the state values to said state value accepting means of said utility diagnosing equipment.

4. A computer-readable medium having embedded therein, a utility diagnosing program for diagnosing a plurality of utilities of an identical type on the basis of state values from the utilities, wherein said program causes a processor to execute:
    a state value accepting step of accepting said state values from said plurality of utilities;
    a state value memory step of storing time-series state values for each utility accepted in said state value accepting step;
    a completing step of completing a missing state value in the time-series state values of the utility stored in said state value memory step;
    a proxy value calculating step of taking statistics of the state values from said plurality of utilities to calculate a proxy value representative of the states of each utility;
    a relative value calculating step of finding a relative value for each utility between the state value of each utility and said proxy value; and
    an output step of outputting said relative value for each utility and/or utility identification information about the utility when said relative value exceeds a predetermined range;
    wherein a completed proxy value at each time is calculated as said proxy value with use of the state value of the utilities at the time completed in said completing step in said proxy value calculating step, and a relative value between the state value of each utility at each time completed in said completing step and said completed proxy value of each time and/or utility identification information about the utility when the relative value exceeds a predetermined range, are/is output in said output step; and
    wherein a moving average of the state values of the utilities at the respective times is found as a moving average width of a predetermined time width to complete the missing state value in said completing step.

5. A computer-readable medium according to claim 4, an average value of the state values of the utilities at the respective times completed in said completing step is used as said completed proxy value at each time in said proxy value calculating step.

6. A computer-readable medium according to claim 4, wherein said program causes a processor to execute:
    an allowable range accepting step of accepting said predetermined range for said relative value; and
    an abnormality decision step of deciding whether or not said relative value of each utility at each time is in said predetermined range accepted in said allowable accepting step,
    wherein, in said output step, when it is decided in said abnormality decision step that there is a relative value not in said predetermined range among said relative values of the utilities at the respective times, the relative value is highlighted.

7. A computer-readable medium according to claim 6, wherein a processor executes a self diagnosis accepting step of accepting an abnormality notification indicating that said state value issued from at least one of the plurality of utilities is abnormal and an allowable range setting step of, when said abnormality notification is accepted in said self diagnosis accepting step, determining said predetermined range on the basis of said relative value of the utility determined as abnormal at an abnormality detection time and passing the predetermined range to said allowable range accepting step.

8. A computer-readable medium according to claim 4, wherein a processor executes a sampling density calculating step of finding a sampling density from a sampling number of said state value with the predetermined time width for each utility, and said sampling number is output together with said relative value at each time in said output steps.

9. A computer-readable medium according to claim 4, wherein a graph including a relative value axis having said relative value as a parameter, a time axis having time as a parameter, and a utility axis having a utility identification information as a parameter and showing the relative value at each time for each utility is output in said output step.

10. A computer-readable medium according to claim 9, wherein, when there is one of the time-series relative values of the utilities exceeding a predetermined range with said time passage, the relative value in said graph is highlighted in said output step.

11. A computer-readable medium according to claim 9, wherein said completed proxy value at each time for each utility is displayed in said graph and the relative value at each time for each utility is displayed with the completed proxy value at each time displayed for each utility as a reference in said output step.

12. A computer-readable medium according to claim 4, wherein, when there are a plurality of types of state values as the state values of said utilities, a processor executes said state value accepting step and said proxy value calculating step for each state value, and a graph including a relative value axis having said relative value as a parameter, a time axis having time as a parameter, and a state value type axis having the type of each state value as a parameter and indicating the relative value at each time for each type of each state value with regard to one of the plurality of utilities is output in response to an external instruction in said output step.

13. A computer-readable medium according to claim 4, wherein a processor executes a relative value memory step of storing said relative value found in said relative value calculating step, and a graph including a relative value axis having said relative value as a parameter, a period-by-period axis having period as a parameter, and a time axis having time in each period as a parameter and indicating the relative value at each time in each period is output in response to an external instruction.

14. A utility diagnosing method for diagnosing a plurality of utilities of an identical type on the basis of state values from the plurality of utilities, comprising:

a state value accepting step of accepting said state values from the plurality of utilities;

a state value memory step of storing time-series state values for each utility accepted in said state value accepting step;

a completing step of completing a missing state value in the time-series state values of the utilities stored in said state value memory step;

a proxy value calculating step of taking statistics of the state values from the plurality of utilities to calculate a proxy value representative of the states of each utility;

a relative value calculating step of a relative value between the state value of each utility and said proxy value; and an output step of outputting said relative value for each utility and/or utility identification information on the utility when said relative value exceeds a predetermined range;

wherein a completed proxy value at each time as said proxy value is calculated in said proxy value calculating step with use of the state value at each time completed in said completing step, and in said output step, a relative value between the state value at each time completed in said completing step and said completed proxy value at each time is output and/or utility identification information on the utility is output when said relative value exceeds a predetermined range; and wherein said completing step finds a moving average of the state values of the utilities at the respective times as a moving average width of a predetermined time width and completes the missing state value.

* * * * *